(12) United States Patent
Kartalov et al.

(10) Patent No.: US 11,563,227 B2
(45) Date of Patent: Jan. 24, 2023

(54) MICROFLUIDIC MICROBACTERIAL FUEL CELL CHIPS AND RELATED OPTIMIZATION METHODS

(71) Applicant: The United States of America as represented by the Secretary of the Navy, San Diego, CA (US)

(72) Inventors: Emil Paskalev Kartalov, Pacific Grove, CA (US); Tricia Nguyen, San Diego, CA (US); Yolanda Meriah Arias-Thode, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/989,963

(22) Filed: Aug. 11, 2020

(65) Prior Publication Data
US 2021/0104767 A1 Apr. 8, 2021

Related U.S. Application Data

(60) Provisional application No. 62/909,452, filed on Oct. 2, 2019.

(51) Int. Cl.
*H01M 8/16* (2006.01)
*H01M 8/0258* (2016.01)
(52) U.S. Cl.
CPC .......... *H01M 8/16* (2013.01); *H01M 8/0258* (2013.01); *H01M 2250/20* (2013.01)
(58) Field of Classification Search
CPC ............................. H01M 8/16; H01M 8/0258
See application file for complete search history.

(56) References Cited

U.S. PATENT DOCUMENTS

2007/0048577 A1* 3/2007 Ringeisen ......... H01M 8/04097
429/513
2011/0300455 A1* 12/2011 Chae ................... H01M 4/8867
429/535

FOREIGN PATENT DOCUMENTS

WO WO 2014-178499 * 11/2014

OTHER PUBLICATIONS

English translation of WO Publication 2014-178499, Nov. 2014.*

* cited by examiner

*Primary Examiner* — Brittany L Raymond
(74) *Attorney, Agent, or Firm* — Naval Information Warfare Center, Pacific; Kyle Eppele; Matthew D. Pangallo

(57) ABSTRACT

Benthic microbial biofuel cells (BMFCs) are a potential non-toxic and renewable source of underwater power. BMFCs function by coupling an anaerobic anode to an oxygenated cathode. However, current in-situ BMFCs on average produce less than 1W of power. Potential causes are internal ohmic resistance and low capture efficiency of the bacteria-generated charge due to macroscopic average distances between bacteria and electrodes.
A microfluidic BMFC chip is enclosed to study those potential causes. The chip is built using elastomer microfluidics to provide biologically-inert microfluidic confinement of the bacteria, forcing them to be no further away than the height of the containment microchamber (..90 μm) from the microelectrode matrix built on the glass substrate of the chip. The matrix captures the charge without location bias (due to its H-architecture) and conducts it to the outside circuit. The microfluidic chip system can be used as an evaluation station to optimize biological parameters, geometry, and electrode scaling towards increased power. That (Continued)

would lead to the development of an optimized power unit that can then be arrayed to build renewable power stations in maritime environments.

16 Claims, 5 Drawing Sheets

701 — Prime Chips prior to burial by injecting a microbial slurry having a desired pH into the microfluidic microbacterial fuel cell chip.

702 — Array chips into a three-dimensional power cube.

703 — Place power cube in a benthic environment.

704 — Electrically connect a power cube to a UUV causing electrons to flow into the UUV.

705 — Once fully charged, disconnect UUV from power cube and use as desired.

Fig. 7

MICROFLUIDIC MICROBACTERIAL FUEL CELL CHIPS AND RELATED OPTIMIZATION METHODS

CROSS-REFERENCE TO RELATED APPLICATIONS

This application is a nonprovisional application claiming priority to U.S. Patent Application Ser. No. 62/909,452, filed on Oct. 2, 2019, entitled "Microfluidic Microbacterial Fuel Cell Chips and Related Optimization Methods," the entire content of which is fully incorporated by reference herein.

FEDERALLY-SPONSORED RESEARCH AND DEVELOPMENT

The Microfluidic Microbacterial Fuel Cell Chips and Related Optimization Methods is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@_navy.mil. Reference Navy Case Number 111925.

BACKGROUND

Large fleets of drones, including unmanned underwater vehicles (UUVs) and sensors, promise to cover a large area of monitoring and control at a fraction of the cost of traditional assets, with significantly reduced logistics tail, and decreased risks for human personne4/. However, such fleets can pose their own logistics challenges. One problem for UUVs is that each one has to be charged on a regular basis due to high levels of water resistance and distance of travel. Without a local power source, charging these UUVs could take a lot of time and risk security issues if all UUVs are charged at once in one place.

Benthic microbial fuel cell (BMFC) technology could act as a local power source. A microbial fuel cell is a bio-electrochemical system that employs facultative or strict anaerobic bacteria to oxidize organic matter and produce direct electrical current. A BMFC uses indigenous bacteria that live in the sediment of the ocean floor. As a result of their natural life processes, these anaerobic microorganisms expel electrons. The expelled charge can be recovered and run through a load connected to a cathode where oxygen in the seawater captures the terminal electron. The outcome is electrical power generated from the bacteria.

BMFCs have been shown to produce meaningful power to sensors, however the average output power density is relatively low, e.g. 10-40 mW/m2. Macroelectrodes may have low capture efficiency due to large average distances between the electrode and cells in current macrosystems such as seawater. Thus, shrinking the distance could improve the efficiency by a significant factor. Elastomeric microfluidic chips may be used as the enabling technology to shrink the distance between the electrode and cells.

Further optimization and study of the system may lead to alternative architectural, scaling, biological, and biochemical parameters, which could significantly improve the output power density and lead to the development of an optimized power unit. Arraying that unit would produce renewable power stations. Since a need still exists for powering UUVs, utilizing arrayed microfluidic microbacterial fuel cell chips may be a potential solution.

BRIEF DESCRIPTION OF THE DRAWINGS

FIG. 7 shows a flow-chart depicting the steps for utilizing a microbaterial fuel cell chip to power a system.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
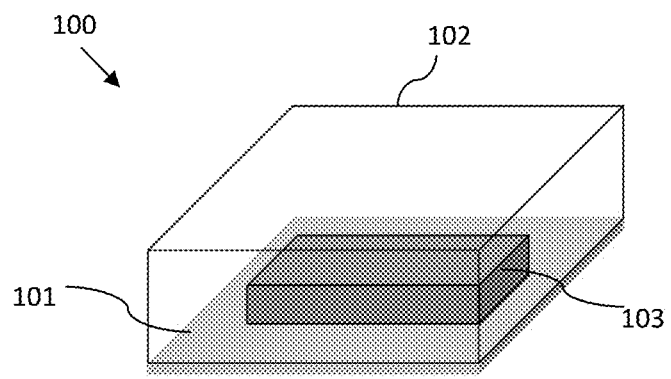
FIG. 1 shows a schematic of a basic microfluidic microbacterial fuel cell chip structure in which a glass substrate couples to a silicone or resin dome to enclose a volume of benthic bacterial cells.

FIG. 1 shows a basic elastomeric microfluidic chip 100 in which a glass substrate 101 couples to a silicone or resin elastomer dome 102 to enclose an electrode matrix 103. Electrode matrix 103 comprises a volume of bacterial cells inherently present in seawater, the bacterial cells serving to release electrons. The height of elastomer dome 102 is the mechanism used to maintain a desired amount of separation between the bacterial cells within electrode matrix 103. Elastomeric microfluidic chip 100 can be combined with a plurality of elastomeric microfluidic chips and arrayed into a 3-D cube-like configuration allowing for the harnessing of power from the bacterial electron release (see FIG. 5).

Figure 2:
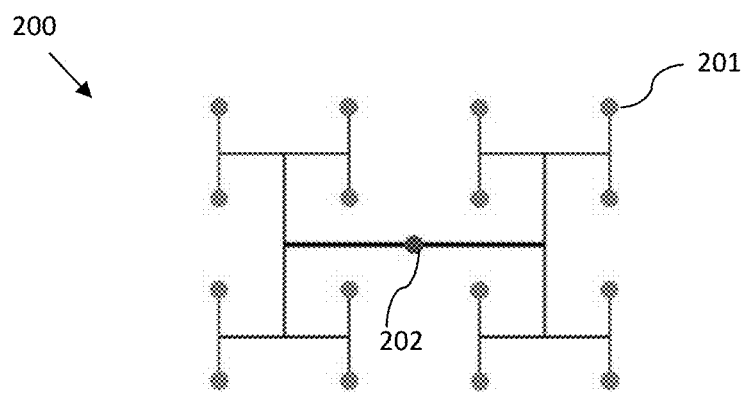
FIG. 2 shows an example of H-architecture, where all points are equidistant to the central point, in accordance with one embodiment of a microfluidic microbacterial fuel cell chip.

FIG. 2 shows an embodiment of H-architecture 200, where points 201 are equidistant to a central point 202, ensuring no bias; where a structure can keep doubling in size yet retain its property. H-architecture minimizes location sampling bias. In regards to an elastomeric microfluidic chip such as in FIG. 1, covering the floor (substrate) of a dome with a solid layer of metal would make a simple capture electrode. That would introduce a location bias in the system, wherein bacteria closer to wires that will carry the electrons to the rest of the circuitry would experience less electrical resistance than the bulk surface area closer to the center of a chip due to decreased electric resistance. This would mean that the same collection of bacteria, if differently distributed, would output a different amount of power. To prevent this, H-architecture is used. H-architecture can be grown to any size by mirror-image doubling (e.g. alternating horizontal and vertical reflections) while preserving its basic property. This allows an ability to start with the smallest element scale and still cover any work area with the matrix.

Figure 3:
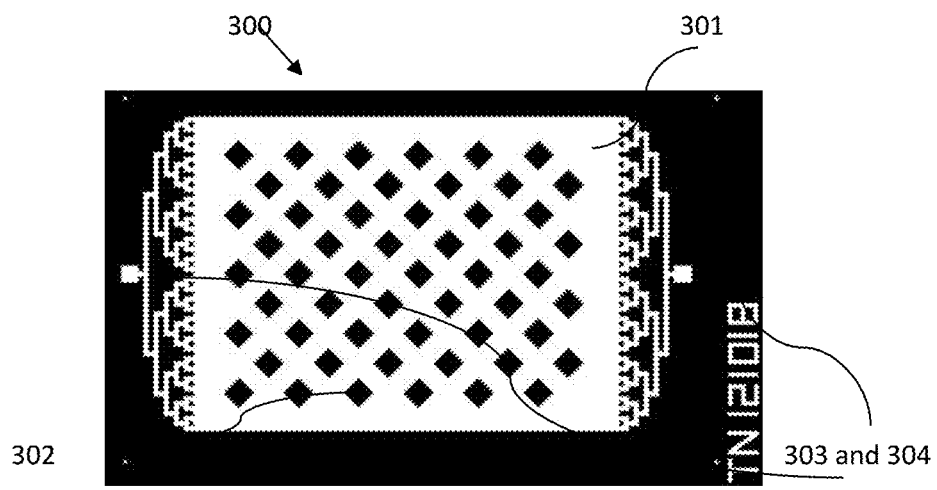
FIG. 3 shows a top view of a microfluidic microbacterial fuel cell chip structure in which microchannels and cavities are defined in silicone to house bacterial cells and media in accordance with the microfluidic microbacterial fuel cell chip.

FIG. 3 shows a top view of a single-layer microfluidic chip 300. Following the same H-architecture to minimize capture bias, an electrode matrix was built as a network of 10 μm-wide conductive paths defined in etched chromium on a quartz substrate. Cavity 301 comprises a plurality of input and output microchannels to be filled with media-carrying bacterial cells prior to placing the chips under water. These media-carrying bacterial cells act as a priming solution ahead of placing the chips in a benthic environment. This priming solution can be injected using a syringe, and helps to create a gravitational effect once the chips are placed underwater causing more water and bacteria to flow into the chip.

Turning back to FIG. 3, solid elastomer dome 302 sits below cavity 301. The plurality of input and an output microchannels in cavity 301 are each split into multiple access locations to a central dome structure (see FIG. 1), by use of H-architecture. The microchannels' width is ~100 μm. The diamond-shaped structures inside solid elastomer dome 302 are support columns (1.4 mm squares) that are included to prevent the collapse of the ~90 μm-tall ceiling of the dome. In one embodiment, the dome has horizontal dimensions of 28×21 mm. A first and second opening 303 and 304 respectively, allow for a priming solution to be piped into the chip. First and second opening 303 and 304 also allow for an exchange with the surrounding environment once single-layer microfluidic chip 300 is buried under water.

Figure 4:
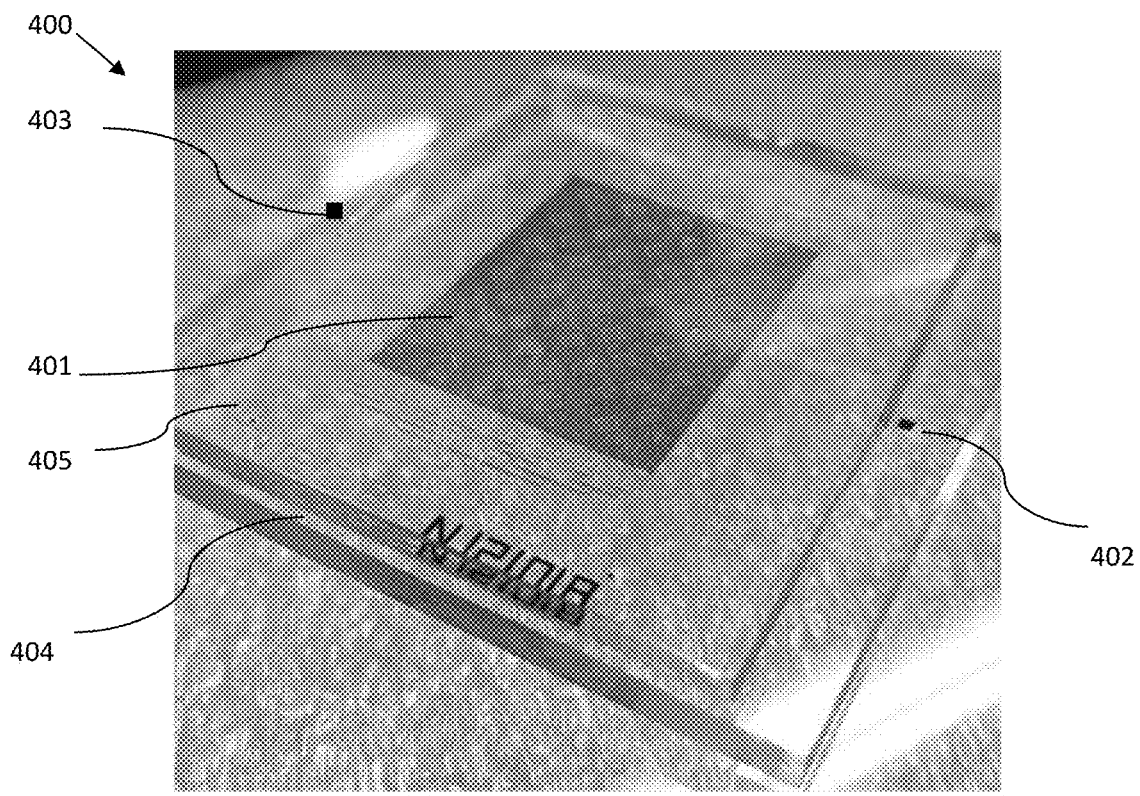
FIG. 4 shows an example of an assembled microfluidic microbacterial fuel cell chip in accordance with one embodiment disclosed herein.

FIG. 4 shows an example of an assembled microfluidic microbacterial fuel cell chip 400 in which a chromium microelectrode matrix 401 in H-architecture is connected to a first and second square solder point 402 and 403, respectively. Solder points 402 and 403 are terminals branching out symmetrically from electrode matrix 401, and are used to electrically connect microfluidic microbial fuel cell chip 400 to a cathode. Microelectrode matrix 401 covers almost all the floor 404 of the microfluidic dome 405 in each chip 400.

Figure 5:
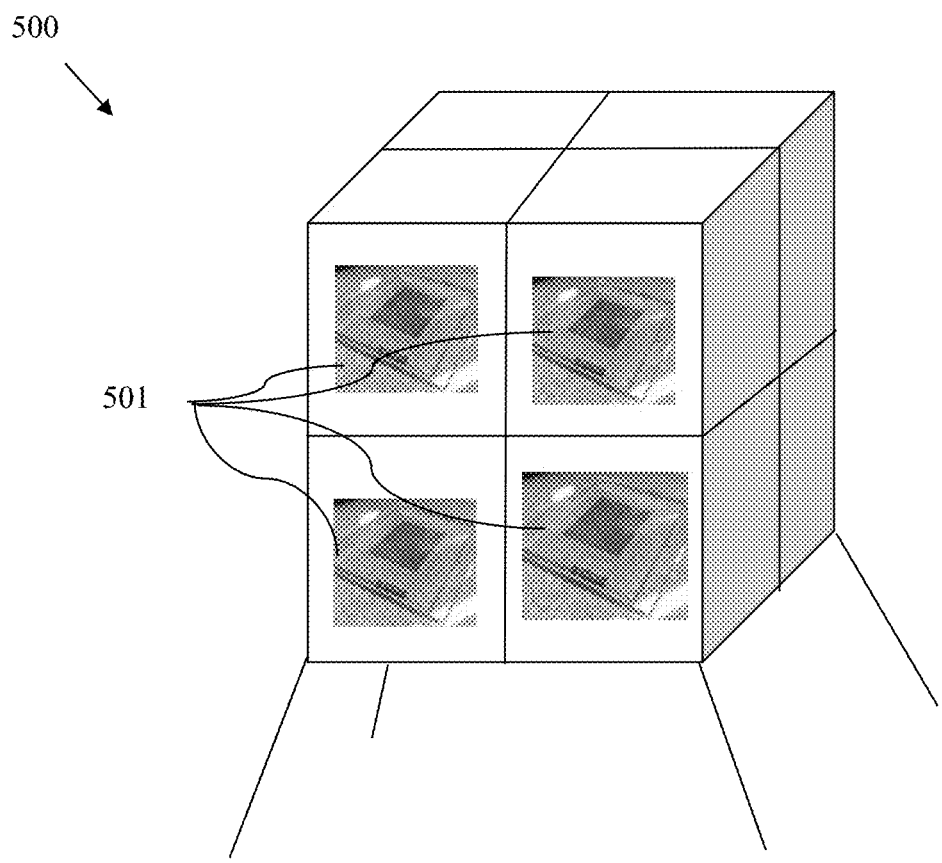
FIG. 5 shows an example of an arrayed microfluidic microbacterial fuel cell chip into a three-dimensional power cube.

FIG. 5 shows an example of a power cube 500 with a microfabricated fractal array 501 of microbacterial fuel cell chips. Microbacterial fuel cell chips are acting as microelectrodes. Elastomeric microfluidic chips combine elastomeric microfluidic control and cell housing with microfabricated fractal arrays of microelectrodes for charge capture. Higher cell density in principle should produce higher power output, but beyond a certain concentration, the system might experience diminishing returns and perhaps even a decrease in output power. Overcrowded living space, excessive waste generation, and hydrogen production due to electron loss may interfere with optimal metabolic processes for the bacteria.

Similarly, bringing the bacteria closer to the electrodes could in principle increase the efficiency. Elastomer microfluidics can provide necessary fluidic control and a reliable non-toxic transparent housing for the bacteria, all within controlled microscale geometries. The size of most spherical bacteria is less than 2 μm, while rod-like cells are up to 10 μm long and up to 1 μm in diameter. In comparison, separation between electrode branches is no more than ~40 μm horizontally, while the microchannel width is ~100 μm and chip ceiling height is ~90 μm. Thus, the geometry forces each cell to be at microscopic distances from its respective closest electrode.

The potential uses of power cube 500 are extensive. For example, power cube 500 can be easily used as a standardized test station to optimize system parameters such as cell concentration, media content, microelectrode scaling, and fluidic architecture (e.g. dome height), all towards maximizing output power density. Power cube 500 could power small sensors or any other device that requires power. Power cube 500 could be used to power acoustic sensor tags for marine mammals. Also, food sources can be included in future chip production as supplemental feeding has been demonstrated to increase power production. In addition, energy harvesting strategies can be included to optimize a charge and discharge cycle for increased power.

Such optimizations will generate phase space diagrams of power versus those parameters. The diagrams would be used to build theoretical models about those functional dependences. The models would be tested against the already collected experimental data. Confirmed models would provide better understanding of the biology and physiology of the microbes, from the viewpoint of their use in renewable power applications. That new basic knowledge would then suggest new areas in parameter space for power applications, leading to further experimental optimizations and improved output power density.

Furthermore, parametric optimization would suggest the best geometry and composition of a "unit" power cell, including size and scaling. That unit can then be super-arrayed to produce larger systems with proportionally larger power output. Our microfabricated system is amenable to such scale-up by a variety of fabrication techniques, such as silk-screening, thin flexible films, and 3D printing. Such would ultimately enable the manufacture of automated power stations offering renewable energy for the refueling of swarms of drones.

Figure 6:
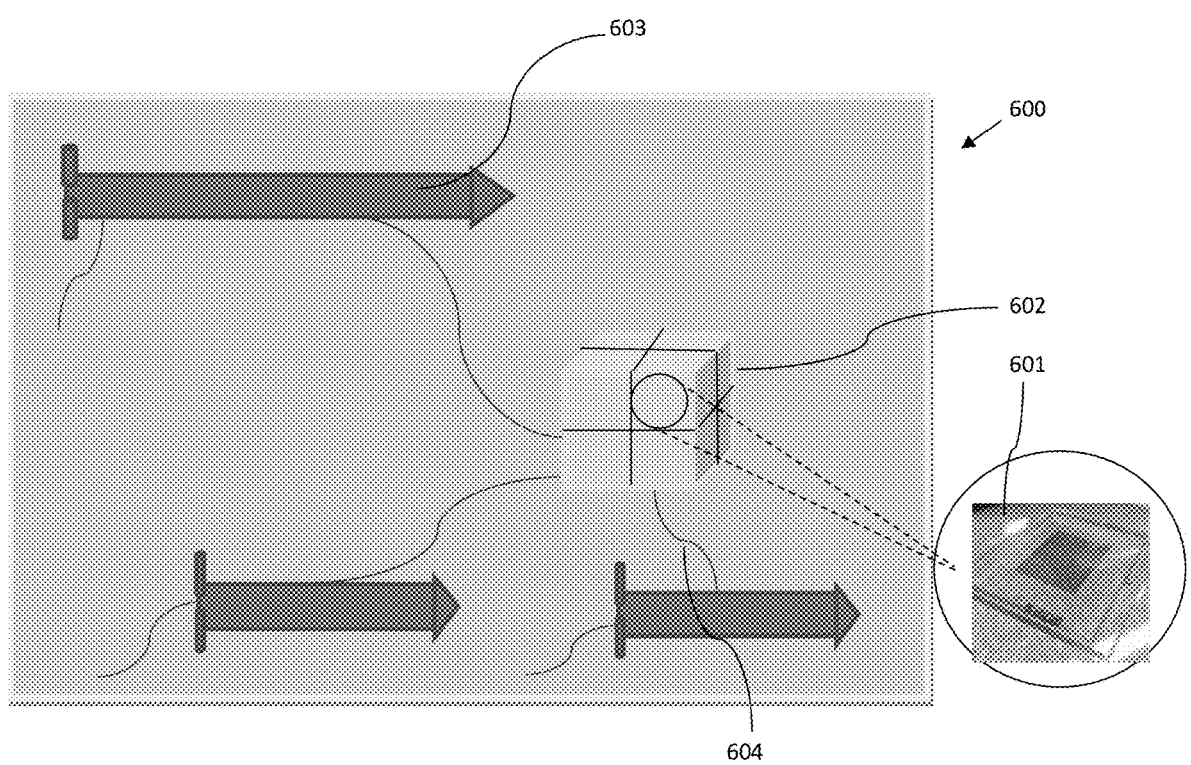
FIG. 6 shows an example of a microbacterial fuel cell chip as part of a system to power an underwater unmanned vehicle.

FIG. 6 shows an illustration of a system 600 whereby a plurality of microbacterial fuel cell chips 601 is arrayed into a three-dimensional-configured power cube 602 and used to power an unmanned unwater vehicle (UUV) 603. In system 600, power cube 602 is electrically connected to UUV 603 with a power cord 604, diverting electron generation to charge UUV 603.

FIG. 7 shows a flow chart of a method demonstrating steps in which to use system 600. For step 701, prime microbacterial fuel cell chips prior to burial by injecting a microbial slurry having a desired pH into the microfluidic microbacterial fuel cell chip. For step 702, array chips into a three-dimensional power cube. For step 703, place power cube in a benthic environment. For step 704, electrically connect a power cube to a UUV causing electrons to flow into the UUV. For step 705, once the UUV is fully charged, disconnect the UUV from power cube and use as desired.

Disclosed herein is a microelectrode microfluidic power unit that uses benthic bacteria to output up to ~48 mW/m2 power density, which (while non-optimized) is already higher than previous devices with macroelectrodes. These results offer corroborating evidence to the hypothesis that shrinking the spacing between bacteria and capture electrodes to the microscale would produce a significant gain in power in comparison to previous macroelectrode systems. Furthermore, the presented chip is an efficient testing platform enabling the optimization of the system's operational parameters in a convenient controlled environment. Once optimized, such a chip can serve as the unit device in an array comprising a large-scale renewable power station. Hence, the presented system and methods are a major step forward in the direction of renewable power systems for maritime environments.

Many modifications and variations of the Microfluidic Microbacterial Fuel Cell Chips and Related Optimization Methods are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A device comprising:
   a microfluidic component, wherein the microfluidic component contains electron-releasing bacterial cells and a dome to contain the electron-releasing bacterial cells;
   a substrate;
   an electrode matrix, wherein the electrode matrix is coupled to the substrate and electrons are collected by the electrode matrix, thereby generating a current, and wherein the generated current is conducted to an external load resulting in power generation, whereby the generated power is expended by the external load; and
   wherein the dome limits a maximal distance between bacterial cells and the electrode matrix on a bottom of the dome at an upper surface of the substrate.

2. The device of claim 1, wherein the external load is suspended in seawater.

3. The device of claim 2, wherein the bacterial cells are benthic microbacteria collected from mud in a seafloor.

4. The device of claim 1, wherein the microfluidic component is made of a polymer or elastomer material.

5. The device of claim 1, wherein the microfluidic component is made by replication molding or injection casting in various polymer or elastomer materials, or is 3D-printed.

6. The device of claim 1, wherein the microfluidic component contains a plurality of microchannels to contain the bacterial cells and bring them within a small maximal distance of the electrode matrix, to facilitate charge collection.

7. The device of claim 6, wherein the microfluidic component is arrayed into a three-dimensional cube.

8. The device of claim 1, wherein the dome is connected to a plurality of inputs or outputs through a system of binary-tree microchannels, wherein the microchannels are configured to minimize fluidic resistance bias within the main chamber.

9. The device of claim 1, wherein the electrode matrix is a plate of metal to be used to collect charge produced by the bacterial cells.

10. The device of claim 1, wherein the electrode matrix is a fractal H-architecture meant to minimize a collection location bias.

11. A method of generating power, comprising the steps of:
    priming the device of claim 1 by injecting the device of claim 1 with the electron-releasing bacterial cells having a pH;
    arraying the device of claim 1 into a three-dimensional power cube with one or more of the device of claim 1;
    placing the power cube in a benthic environment;
    electrically connecting the power cube to a load causing electrons to flow into the load and generating power;
    fully charging the load;
    disconnecting the load from the power cube and using.

12. The method of claim 11, wherein the load is an underwater unmanned device.

13. The method of claim 11, wherein the power cube is electrically connected to a plurality of loads.

14. A method of optimizing power output of the device of claim 1, then upscaling a system by connecting a plurality of the devices in parallel to generate more output voltage and power to produce a renewable power station.

15. The method of claim 14, wherein the device of claim 1 is a microfluidic microbacterial fuel cell chip.

16. The method of claim 15, wherein the renewable power station is contained in a benthic environment.

* * * * *